(12) United States Patent
Sox et al.

(10) Patent No.: US 12,405,209 B2
(45) Date of Patent: Sep. 2, 2025

(54) APPARATUS AND METHOD FOR GRAZING ANGLE MEASUREMENT

(71) Applicant: The Boeing Company, Arlington, VA (US)

(72) Inventors: Daniel J. Sox, St. Charles, MO (US); Jeffery Murphy, Troy, MO (US); James Tad Wegner, St. Louis, MO (US); Brian Gunther, St. Louis, MO (US)

(73) Assignee: The Boeing Company, Arlington, VA (US)

( * ) Notice: Subject to any disclaimer, the term of this patent is extended or adjusted under 35 U.S.C. 154(b) by 166 days.

(21) Appl. No.: 18/313,280

(22) Filed: May 5, 2023

(65) Prior Publication Data

US 2024/0369470 A1 Nov. 7, 2024

(51) Int. Cl.
*G01N 21/03* (2006.01)
*G01N 21/55* (2014.01)

(52) U.S. Cl.
CPC .............. *G01N 21/03* (2013.01); *G01N 21/55* (2013.01); *G01N 2021/0339* (2013.01); *G01N 2021/0378* (2013.01)

(58) Field of Classification Search
CPC .......... G01J 3/0254; G01N 2021/0339; G01N 2021/0378; G01N 2021/4752; G01N 2021/4759; G01N 2021/4783; G01N 2021/575; G01N 21/03; G01N 21/0303; G01N 21/474; G01N 21/4785; G01N 21/55; G01N 21/57
See application file for complete search history.

(56) References Cited

U.S. PATENT DOCUMENTS

| | | | | |
|---|---|---|---|---|
| 4,186,838 A | * | 2/1980 | Levitt | G01N 21/4738 209/581 |
| 4,921,351 A | * | 5/1990 | Kohigashi | G01N 21/474 356/323 |
| 4,972,092 A | * | 11/1990 | Schmitt | G01B 11/303 250/559.11 |
| 4,991,106 A | * | 2/1991 | Judge | G01R 31/308 324/102 |
| 5,359,406 A | * | 10/1994 | Suzuki | G01J 1/42 250/228 |

(Continued)

*Primary Examiner* — John R Lee
(74) *Attorney, Agent, or Firm* — Harrity & Harrity, LLP

(57) ABSTRACT

A system for performing grazing angle measurements is disclosed herein. The system includes a laser configured to emit a beam of light and a series of reflective elements configured to direct the beam of light and a hollow sphere is rotatable about a sphere axis with the sphere axis extending through a central region of the hollow sphere. The hollow sphere defines an elongated slot for accepting the beam of light when the hollow sphere is in one of a plurality of predetermined rotational positions about the sphere axis. A mounting arm extends into a central region of the hollow sphere and includes a sample mount configured to receive a sample. The system further includes a spectral hemispherical reflectance detector having a field of view extending into the hollow sphere and a baffle horizontally interposed relative to the sphere axis between the spectral hemispherical reflectance detector and the elongated slot.

20 Claims, 3 Drawing Sheets

(56) References Cited

U.S. PATENT DOCUMENTS

| | | | | |
|---|---|---|---|---|
| 5,475,234 | A * | 12/1995 | Xu | G01N 21/49 |
| | | | | 250/573 |
| 5,517,315 | A * | 5/1996 | Snail | G01N 21/474 |
| | | | | 356/451 |
| 10,371,628 | B2 * | 8/2019 | Rogers | G01N 21/3563 |
| 10,746,650 | B2 * | 8/2020 | Kawano | G01N 21/27 |
| 11,327,013 | B2 * | 5/2022 | Shawgo | G01N 21/55 |
| 11,567,004 | B2 * | 1/2023 | Labayrade | G01J 3/504 |
| 2002/0183600 | A1 * | 12/2002 | Tsenkova | G01N 21/359 |
| | | | | 422/74 |
| 2002/0198441 | A1 * | 12/2002 | Tsenkova | G01N 21/359 |
| | | | | 422/74 |
| 2019/0041323 | A1 * | 2/2019 | Rogers | G01N 21/85 |
| 2019/0285540 | A1 * | 9/2019 | Kawano | G01N 21/57 |
| 2024/0369470 | A1 * | 11/2024 | Sox | G01N 21/03 |

\* cited by examiner

APPARATUS AND METHOD FOR GRAZING ANGLE MEASUREMENT

FIELD

The present disclosure relates to the field of optics, and in particular, to devices that measure reflectance of materials.

BACKGROUND

Measuring the spectral hemispherical reflectance of a sample remains a complex task. Such a process may involve placing a reference material having a known level of reflectance in a measuring device, measuring reflectance values of the reference material, removing the reference material from the device, determining a correction value based on the measured values for the reference material, replacing the reference material with a sample to be measured, and then finally measuring the sample.

These issues are compounded when attempting to accurately measure reflectance of a sample at high angles of incidence (i.e., angles that are close to tangential/parallel with the surface) at a high degree of accuracy. Some devices attempt to account for this issue by utilizing an interior surface of the measuring device as a reference material. However, such devices are capable of only single angle measurements, which substantially increases the amount of labor involved in quantifying the reflectance of a sample at a variety of angles of incidence.

Because of the issues described above, designers of devices that measure spectral hemispherical reflectance continue to seek out enhanced designs that are capable of rapidly measuring reflectance across a variety of angles of incidence, and that also are capable of accounting for potential sources of error when taking such measurements.

Therefore, it would be desirable to have a method and apparatus that addresses at least some of the issues discussed above.

DESCRIPTION OF THE DRAWINGS

Some embodiments of the present disclosure are now described, by way of example only, and with reference to the accompanying drawings. The same reference number represents the same element or the same type of element on all drawings.

SUMMARY

Figure 1:
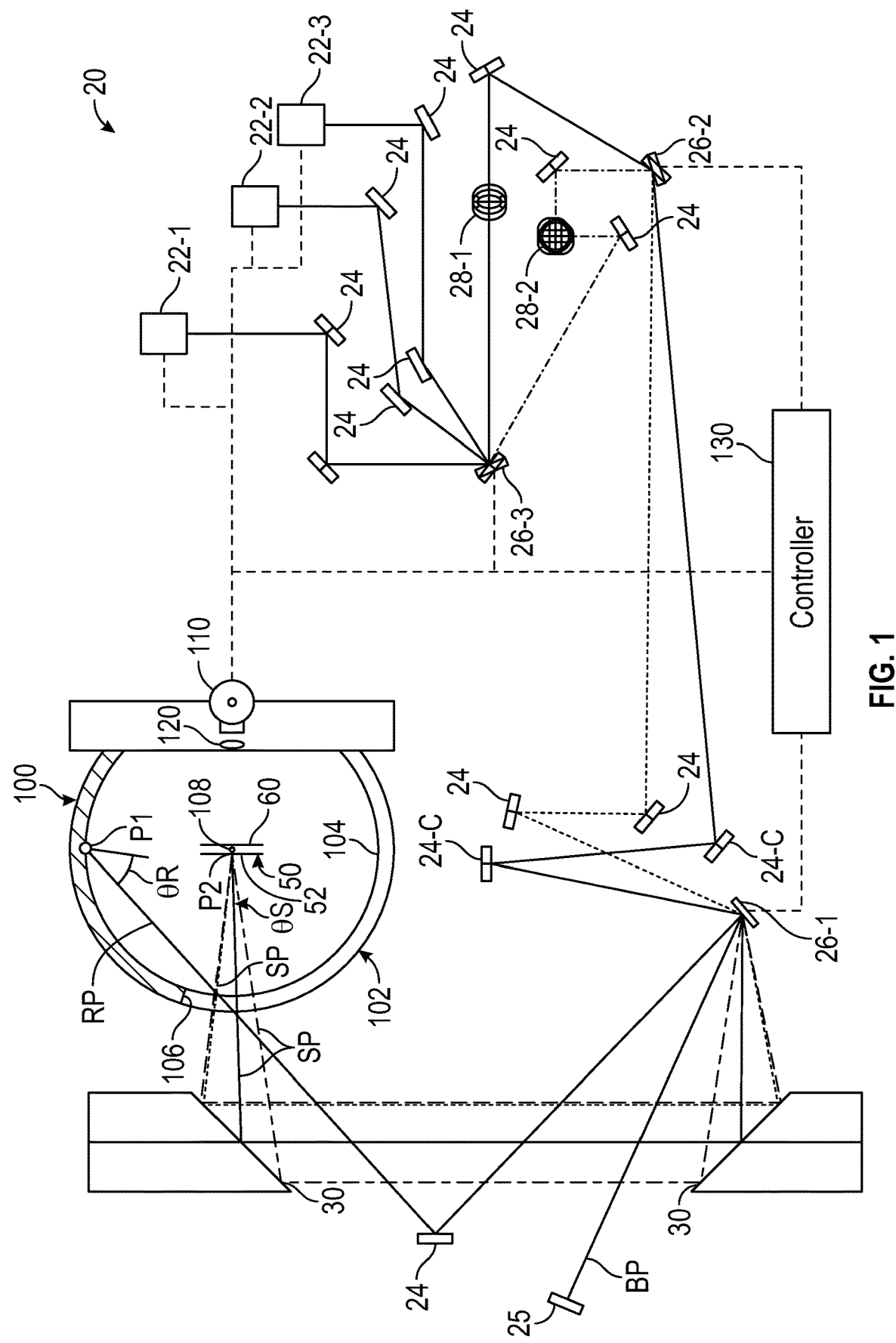
FIG. 1 is a top cut-through view of a system for measuring spectral hemispherical reflectance of a sample according to an exemplary embodiment.

A system for performing grazing angle measurements is disclosed herein. The system includes a laser configured to emit a beam of light and a series of reflective elements configured to direct the beam of light from the laser and a hollow sphere is rotatable about a sphere axis with the sphere axis extending through a central region of the hollow sphere. The hollow sphere defines an elongated slot for accepting the beam of light when the hollow sphere is in one of a plurality of predetermined rotational positions about the sphere axis. A mounting arm extends into a central region of the hollow sphere and includes a sample mount configured to receive a sample. The system further includes a spectral hemispherical reflectance detector includes a field of view extending into the hollow sphere and a baffle horizontally interposed relative to the sphere axis between the spectral hemispherical reflectance detector and the elongated slot.

In one or more embodiments of the system, the spectral hemispherical reflectance detector is horizontally aligned with the elongated slot.

In one or more embodiments of the system, the mounting arm is configured to rotate the sample about a mount axis that is perpendicular to the sphere axis.

In one or more embodiments of the system, a longitudinal axis of a projected field of view of the spectral hemispherical reflectance detector is perpendicular to the sphere axis.

In one or more embodiments of the system, the series of reflective elements include a pair of opposing off-axis parabolic mirrors configured to direct the beam of light through the elongated slot in the hollow sphere.

In one or more embodiments of the system, the series of reflective elements include a first galvanometer configured to direct the beam of light into one of the pair of opposing off-axis parabolic mirrors at a plurality of different angles.

In one or more embodiments of the system, the series of reflective elements include at least one converging mirror configured to focus the beam of light from the laser into the first galvanometer.

In one or more embodiments of the system, the series of reflective elements include a second galvanometer configured to direct the beam of light into the at least one focusing mirror or into at least one fixed non-focusing mirror.

In one or more embodiments of the system, the series of reflective elements include a third galvanometer configured to receive the beam of light from the laser and direct the beam of light into one of a first periscope having a first polarization or a second periscope having a second polarization prior to the beam of light reaching the second galvanometer.

In one or more embodiments of the system, the baffle is attached to the mounting arm on an opposite side of the mounting arm from the sample mount and the sample mount is located adjacent a distal end of the mounting arm.

In one or more embodiments of the system, a projected field of view of the spectral hemispherical reflectance detector onto the baffle is less than or equal to a detector surface area of the baffle.

In one or more embodiments of the system, the spectral hemispherical reflectance detector is at least partially aligned with the elongated slot relative to the sphere axis.

A method of calculating a spectral hemispherical reflectance for a sample is provided herein. The method includes emitting a beam of light from a laser and directing the beam of light with a series of reflective elements through an elongated slot defined by a hollow sphere between a plurality of predetermined angles of incidences striking a sample at each of a plurality of different predetermined rotational positions of the hollow sphere. The method includes collecting reflectance data sets corresponding to each of the plurality of predetermined angles of incidence striking the sample at each of the plurality of different predetermined rotational positions of the hollow sphere with a spectral hemispherical reflectance detector. The method further includes calculating the spectral hemispherical reflectance for the sample based on the plurality of reflectance data sets.

In one or more embodiments of the method, the method includes directing the beam of light with the series of reflective elements through the elongated slot to strike an interior surface of the hollow sphere and directing the beam of light with the series of reflective elements to strike a light absorbing material.

In one or more embodiments of the method, the series of reflective elements include at least one converging mirror for angles of incidence striking the sample at 75 degrees or more.

In one or more embodiments of the method, the method includes directing the beam of light with the series of reflective elements includes utilizing at least one galvanometer to direct the beam of light into a pair of opposing off-axis parabolic mirrors to create the plurality of predetermined angles of incidence striking the sample.

In one or more embodiments of the method, the method includes rotating the sample about an axis of rotation perpendicular to an axis of rotation of the hollow sphere.

A non-transitory computer readable medium embodying programmed instructions which, when executed by a processor, are operable for performing a method is disclosed herein. The method includes emitting a beam of light from a laser and directing the beam of light with a series of reflective elements through an elongated slot in a hollow sphere between a plurality of predetermined angles of incidences striking a sample at each of a plurality of different rotational positions of the hollow sphere. The method includes collecting a plurality of reflectance data sets corresponding to each of the plurality of predetermined angles of incidence striking the sample at each of the plurality of rotational positions of the hollow sphere with a spectral hemispherical reflectance detector. The method further includes calculating a spectral hemispherical reflectance for the sample based on the plurality of reflectance data sets.

In one or more embodiments, the method includes rotating the sample about an axis of rotation perpendicular to an axis of rotation of the hollow sphere.

In one or more embodiments, the method includes directing the beam of light with the series of reflective elements includes utilizing at least one galvanometer to direct the beam of light into a pair of opposing off-axis parabolic mirrors to create the plurality of predetermined angles of incidence striking the sample.

DESCRIPTION

The Figures and the following description illustrate specific exemplary embodiments of the disclosure. A person of ordinary skill in the art will be able to devise various arrangements that, although not explicitly described or shown herein, embody the principles of the disclosure and are included within the scope of the disclosure. Furthermore, any examples described herein are intended to aid in understanding the principles of the disclosure and are to be construed as being without limitation to such specifically recited examples and conditions. As a result, the disclosure is not limited to the specific embodiments or examples described below but by the claims and their equivalents.

Figure 2:
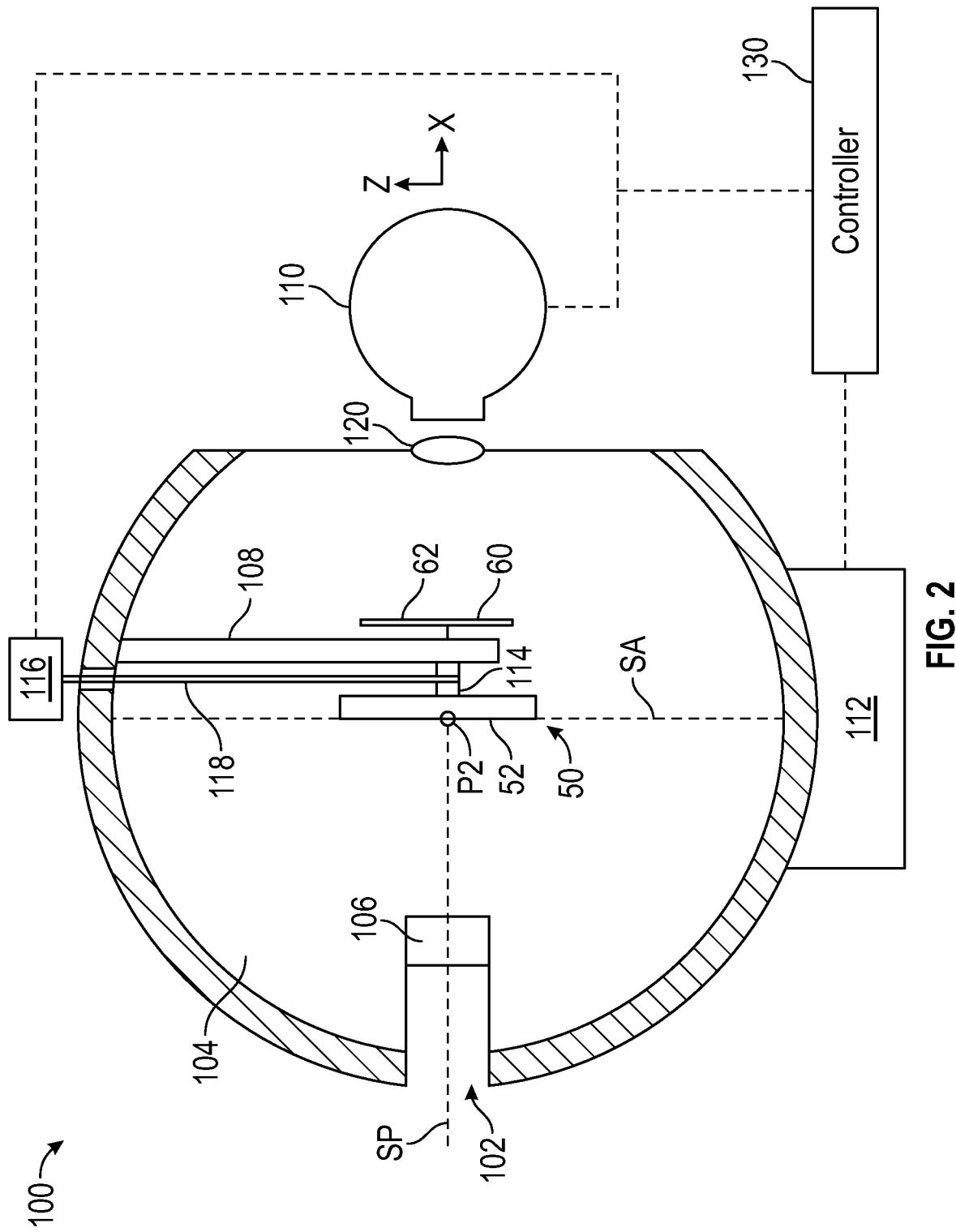
FIG. 2 is a cross-sectional view of a hollow sphere used in the system for measuring spectral hemispherical reflectance of FIG. 1.

FIGS. 1-2 illustrate views of a system for measuring spectral hemispherical reflectance of a sample in an exemplary embodiment. This system may be utilized to measure spectral hemispherical reflectance of a sample at high angles of incidence (e.g., eighty-seven degrees or more, such as eighty-nine degrees or more). As used herein, such angles are referred to as "grazing angles" because the laser beam "grazes" the sample at these high angles of incidence.

FIG. 1 is a top cut-through view of an example spectral hemispherical measurement system 20. The system 20 comprises any combination of components or devices that can measure spectral hemispherical reflectance at a surface 52 of a sample 50 across multiple angles of incidence. In the illustrated embodiment, the system 20 includes multiple lasers 22-1, 22-2, and 22-3, which generate beams of light that travel through the system 20 as will be described in greater detail below. However, the system 20 can operate with only a single one of the laser 22-1, 22-2, 22-3.

The beams of light generated by the lasers 22-1, 22-2, 22-3 proceed through a series of reflective elements, which physically engage in Time Domain Multiplexing (TDM) of the beam to quickly acquire a zero signal, a reference signal, and a sample single for each angle of incidence at the sample 50. That is, the beam is iteratively sent along a sample path SP to sample 50, a reference path RP, or a blocked path BP through a series of reflective elements, such as reflectors 24, galvanometers 26, periscopes 28, or off-axis parabolic mirrors 30. As used herein, while the beam is sent along the sample path it is referred to as being in the sample state, while the beam is sent along the reference path it is referred to as being in the reference state, and while the beam is blocked it is referred to as being in the blocked state.

The series of reflective elements include galvanometers 26-1, 26-2, 26-3 that rotate such that the beam repeatedly transitions through the three states and repeat at a rate of 60-100 Hertz (Hz). A controller 130 controls a rotational position of the galvanometers 26-1, 26-2, 26-3 enabling the controller 130 to correlate different time periods with the different states of lasers 22-1, 22-2, 22-3 (e.g., sample state, reference state, blocked state). The controller 130 can also select between a first periscope 28-1 and a second periscope 28-2 with a third galvanometer 26-3 to change a polarity of the beam of light traveling through the series of reflective elements into the hollow sphere 100.

Any of the various control elements (e.g., electrical, or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-transitory computer readable medium, non-volatile storage, logic, or some other physical hardware component or module.

Beams of light from any of the lasers 22-1, 22-2, and 22-3 traveling along the reference path RP travel through the arcuate slot 102, striking point P1 on inner surface 104 of a hollow sphere 100 at an angle of incidence θR. Inner surface 104 may be made from a diffuse reflective material having known reflectance properties. Alternatively, the coating need not have known reflectance properties, but be coated with a uniform diffuse material that is highly reflective to increase signal levels for accurate measurements. Inner surface 104 may be a spherical surface that, while machined accurately, has a relatively rough diffuse reflective surface.

Beams of light from the lasers 22-1, 22-2, 22-3 traveling along the sample path SP also travel through the slot 102, but strike point P2 at a surface 52 of a sample 50 at an angle of incidence θS. At high angles of incidence, the footprint of the beam at surface 52 increases. The slot 102 terminates at a wall 106, and the sample 50 is supported by a mounting arm 108 extending into a central region of the hollow sphere 100 with the sample 50 spaced from the inner surface 104 and cantilevered on a distal end of the mounting arm 108.

A spectral hemispherical reflectance detector 110 measures reflectance to acquire zero, reference, and sample values for spectral hemispherical reflectance of the sample 50. The detector 110 may comprise any suitable light detector. In one embodiment, the detector 110 comprises a Mercury Cadmium Telluride (MCT) detector that detects long-wave Infrared (IR) light, although other types of detectors may be utilized to detect light having different wavelengths (e.g., mid-range IR, visible light, ultraviolet (UV) light, etc.).

The controller 130 receives input from the detector 110, which is used to calculate a spectral hemispherical reflectance of the sample 50. This input may be pre-amplified, filtered with a low-pass filter, Analog-to-Digital (A/D) converted, and stored in memory on the controller 130 such that each input measurement is associated with a different point in time.

The controller 130 may further correlate the input with zero states, reference states, and/or sample states based on timing input from the position of the galvanometer 26-1. The galvanometer 26-1 directs the laser along the sample path SP, the reference path RP, and the blocked path BP. When the beam of light is traveling along the blocked path BP, the galvanometer 26-1 directs the beam of light to a light absorbing material 25. After one or more sample, reference, and zero measurements have been acquired as input for a given angle of incidence, the controller 130 may direct the galvanometer 26-1 or the hollow sphere 100 to a different rotational position to measure another angle of incidence.

One feature of utilizing the galvanometer 26-1 in connection with the pair of off-axis parabolic mirrors 30 is the ability to obtain multiple measurements with varying degrees of incidence relative to the sample 50 without having to rotate the sphere 100. This reduces measurement noise introduced from the rotation of the sphere 100 and reduces the time to measure varying degrees of incidence as the galvanometer 26-1 can rotate more quickly without introducing additional noise into the measurements as compared to rotating the hollow sphere 100. In one example, the system 20 can obtain up to 90 measurements by positioning the sphere 100 in six different predetermined rotational positions and utilizing the galvanometer 26-1 in connection with the pair of off-axis parabolic mirrors 30 to obtain fifteen different angles of incidence for the beam of light at leach of the predetermined positions of the hollow sphere 100.

In this manner, system 20 can rapidly acquire zero input, sample input, and reference input at a variety of angles of incidence, including high angles of incidence such as eighty-nine degrees or even higher (the range of angles measured may include angles between zero degrees and eighty-nine degrees). Furthermore, this measurement process is performed without the need to replace the sample 50 with a reference material, since the inner surface 104 of sphere 100 is utilized for this purpose. Such practices beneficially eliminate substitution errors that are common when engaging in spectrophotometry.

When the system 20 is being calibrated, a sample 50 with a known reflectance is attached to the sample mount 114 and then has its reflectance measured at each angle, different polarization states, and through the different focusing mirror 24, 24-C positions. The results are collected by the detector 110 and compared to the known values of reflectance to create a correction factor. The inner surface 104 of the sphere 100 is used when measuring the reference input to determine a reference signal level that is also collected by the detector 110. The reference signal level will provide information regarding laser power drift, varying atmospheric absorption, and other sources of instability in the system 20.

For configurations where the angle of incidence of the beam of light relative to the sample 50 is above 75 degrees, the controller 130 can utilize a pair of converging mirrors 24-C to focus the beam of light from the lasers 22-1, 22-2, 22-3. One feature of utilizing the converging mirrors 24-C for higher angles of incidence is to reduce the footprint size of the beam of light. The reduction in footprint size of the beam of light improves reflectance measurements at higher angles of incidence by the detector 110. Although the illustrated example only includes a single pair of converging mirrors 24-C, the system 20 can include additional converging mirrors 24-C that could be selected with the galvanometer 26-2 to provide different focal lengths for further control over the footprint size of the beam at the sample 50.

FIG. 2 is a side cross-sectional view of the hollow sphere 100 of FIG. 1 taken along a horizontal plane. FIG. 2 illustrates the sample 50 suspended adjacent to a distal end of the mounting arm 108. The mounting arm 108 also supports a baffle 60 on an opposite lateral side of the sample 50. The baffle 60 includes one side that faces the detector 110 and a second side that faces the sample 50 is located on an opposite side of the baffle 60 from the detector 110. The baffle 60 is horizontally interposed (i.e., along X-axis) between the detector 110 and the sample path SP, and the detector is at least partially aligned with the elongated slot 102 relative to the sphere axis of rotation. The baffle 60 prevents detector 110 from receiving a first bounce reflection from P1 (FIG. 1) and P2 and also provides a uniform measurement area for the detector to view. The baffle 60 may be made of a diffusive reflective material that is the same or like the material coating the inner surface 104. Also, the sample 50 is attached to a sample mount 114 at a point on the mounting arm 108 such that the point P2 has an approximately equal (within 15%) radial distance from the inner surface 104 of the hollow sphere 100. This allows a front face of the sample to be exactly at a center of the sphere 100 which is also at a center of rotation of the sphere 100.

The hollow sphere 100 is rotatable about a sphere axis SA by an actuator 112 controlled by the controller 130 between the predetermined rotational positions of the hollow sphere 100. In the illustrated example, the sphere axis SA extends through the point P2 on the sample 50 and a center of the sphere 100. Also, the sample 50 is attached to the mounting arm 108 by a sample mount 114. The sample mount 114 is rotatable relative to the mounting arm 108 and can be driven by an actuator 116 through a drive member 118, such as a belt, chain, or geared shaft, to rotate the sample 50 about a mount axis that extends through the point P2 and is perpendicular to the sphere axis SA. The actuator 116 is also controlled by the controller 130 to position the sample 50 at different rotational positions.

In this embodiment, the detector 110 may also include an internal baffle (not shown) that limits its detection radius to a detection surface area 62 on the baffle 60. The limited detection radius on the detector 110 prevents the detector 110 from directly viewing the inner surface 104 of the sphere 100. A longitudinal axis of a projected field of view of the detector 110 is perpendicular to the sphere axis SA. An imaging lens 120 may be horizontally interposed between the detector 110 and the baffle 60 to direct light samples from the reference path RP and sample path SP into the detector 110.

Figure 3:
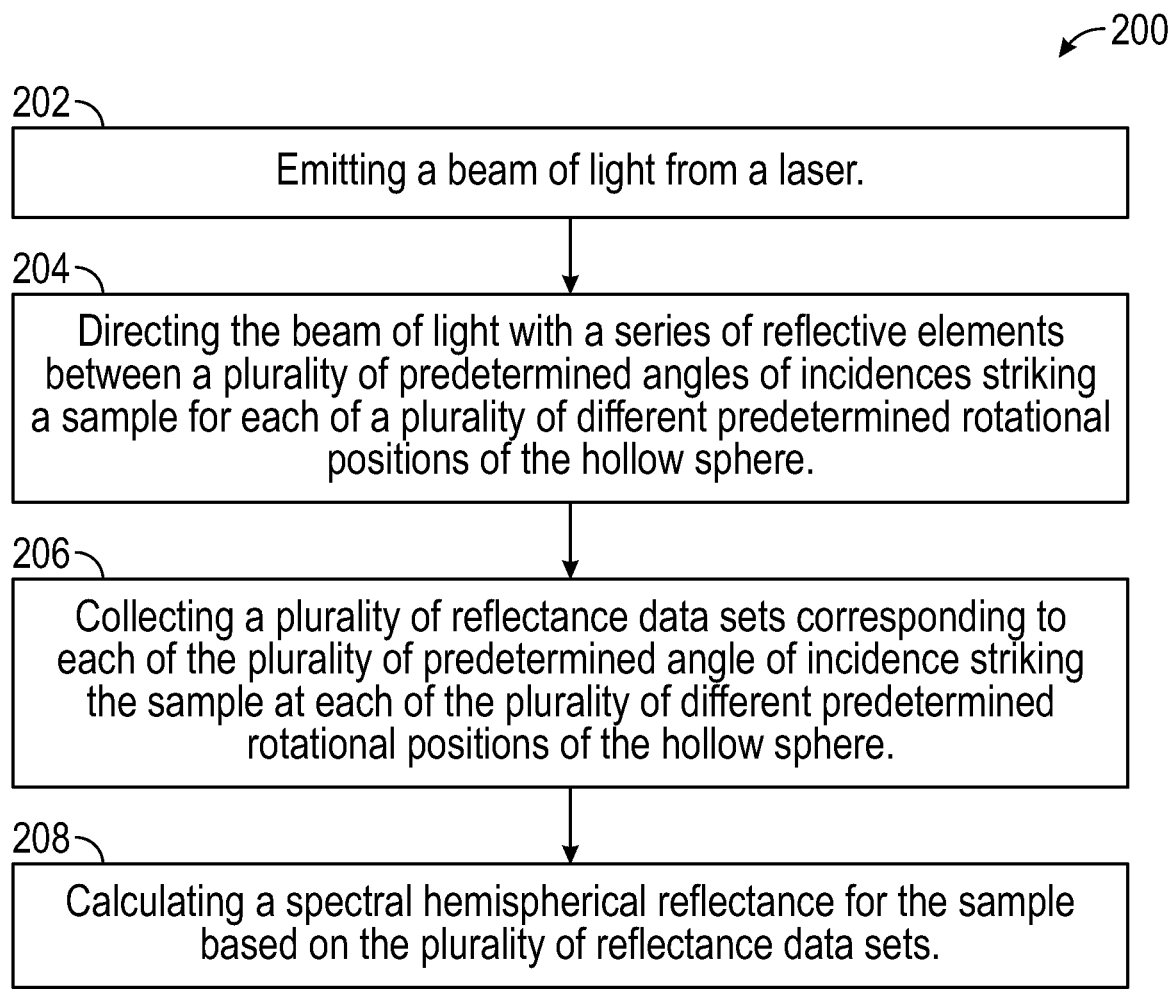
FIG. 3 is a flowchart illustrating a method for operating the system of FIG. 1 to measure spectral hemispherical reflectance at a variety of angles according to an exemplary embodiment.

FIG. 3 illustrates an example method 200 of determining a spectral hemispherical reflectance for a sample according to this disclosure. The method includes emitting a beam of light from a laser (Block 202), such as one of the lasers 22-1, 22-2, 22-3. The beam of light is directed with a series of reflective elements through the elongated slot 102 in the hollow sphere 100 between a plurality of predetermined angles of incidences striking the sample 50 at each of a plurality of different predetermined rotational positions of the hollow sphere 100. (Block 204). In one example, the hollow sphere 100 may move between six different predetermined rotational positions and the series of reflective elements directing the beam of light can move the beam of light between 15 different predetermined angles. This produces up to 90 predetermined angles of incidence of the beam of light striking the sample 50 for measuring reflectance.

The controller 130 can then collect a plurality of reflectance data sets corresponding to each of the plurality of predetermined angle of incidence striking the sample at each of the plurality of rotational positions of the hollow sphere 100 with the spectral hemispherical reflectance detector 110 (Block 206). Once the plurality of data sets have been collected, the controller 130 can calculate a spectral hemispherical reflectance for the sample 50 from the plurality of reflectance data sets (Block 208).

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

The following Clauses provide example configurations of systems and methods for obtaining grazing angle measurements with the system 20 of FIG. 1.

Clause 1: A system comprising: a laser configured to emit a beam of light; a series of reflective elements configured to direct the beam of light from the laser; a hollow sphere rotatable about a sphere axis with the sphere axis extending through a central region of the hollow sphere, wherein the hollow sphere defines an elongated slot for accepting the beam of light when the hollow sphere is in one of a plurality of predetermined rotational positions about the sphere axis; a mounting arm extending into a central region of the hollow sphere, the mounting arm including a sample mount configured to receive a sample; a spectral hemispherical reflectance detector including a field of view extending into the hollow sphere; and a baffle horizontally interposed relative to the sphere axis between the spectral hemispherical reflectance detector and the elongated slot.

Clause 2: The system of clause 1, wherein the spectral hemispherical reflectance detector is horizontally aligned with the elongated slot.

Clause 3: The system of clauses 1 or 2, wherein the mounting arm is configured to rotate the sample about a mount axis that is perpendicular to the sphere axis.

Clause 4: The system of clauses 1-3, wherein a longitudinal axis of a projected field of view of the spectral hemispherical reflectance detector is perpendicular to the sphere axis.

Clause 5: The system of clauses 1-4, wherein the series of reflective elements include a pair of opposing off-axis parabolic mirrors configured to direct the beam of light through the elongated slot in the hollow sphere.

Clause 6: The system of clauses 1-5, wherein the series of reflective elements include a first galvanometer configured to direct the beam of light into one of the pair of opposing off-axis parabolic mirrors at a plurality of different angles.

Clause 7: The system of clauses 1-6, wherein the series of reflective elements include at least one converging mirror configured to focus the beam of light from the laser into the first galvanometer.

Clause 8: The system of clauses 1-7, wherein the series of reflective elements include a second galvanometer configured to direct the beam of light into the at least one focusing mirror or into at least one fixed non-focusing mirror.

Clause 9: The system of clauses 1-8, wherein the series of reflective elements include a third galvanometer configured to receive the beam of light from the laser and direct the beam of light into one of a first periscope having a first polarization or a second periscope having a second polarization prior to the beam of light reaching the second galvanometer.

Clause 10: The system of clauses 1-9, wherein the baffle is attached to the mounting arm on an opposite side of the mounting arm from the sample mount and the sample mount is located adjacent a distal end of the mounting arm.

Clause 11: The system of clauses 1-10, wherein a projected field of view of the spectral hemispherical reflectance detector onto the baffle is less than or equal to a detector surface area of the baffle.

Clause 12: The system of clauses 1-11, wherein the spectral hemispherical reflectance detector is at least partially aligned with the elongated slot relative to the sphere axis.

Clause 13: A method of calculating a spectral hemispherical reflectance for a sample, the method comprising: emitting a beam of light from a laser; directing the beam of light with a series of reflective elements through an elongated slot defined by a hollow sphere between a plurality of predetermined angles of incidences striking a sample at each of a plurality of different predetermined rotational positions of the hollow sphere; collecting a plurality of reflectance data sets corresponding to each of the plurality of predetermined angles of incidence striking the sample at each of the plurality of different predetermined rotational positions of the hollow sphere with a spectral hemispherical reflectance detector; and calculating the spectral hemispherical reflectance for the sample based on the plurality of reflectance data sets.

Clause 14: The method of clauses 13, including directing the beam of light with the series of reflective elements through the elongated slot to strike an interior surface of the hollow sphere and directing the beam of light with the series of reflective elements to strike a light absorbing material.

Clause 15: The method of clauses 13 or 14, wherein the series of reflective elements include at least one converging mirror for angles of incidence striking the sample at 75 degrees or more.

Clause 16: The method of clauses 13-15, wherein directing the beam of light with the series of reflective elements includes utilizing at least one galvanometer to direct the beam of light into a pair of opposing off-axis parabolic mirrors to create the plurality of predetermined angles of incidence striking the sample.

Clause 17: The method of clauses 13-16, including rotating the sample about an axis of rotation perpendicular to an axis of rotation of the hollow sphere.

Clause 18: A non-transitory computer readable medium embodying programmed instructions which, when executed by a processor, are operable for performing a method comprising: emitting a beam of light from a laser; directing the beam of light with a series of reflective elements through an elongated slot in a hollow sphere between a plurality of predetermined angles of incidences striking a sample at each of a plurality of different rotational positions of the hollow sphere; collecting a plurality of reflectance data sets corresponding to each of the plurality of predetermined angles of incidence striking the sample at each of the plurality of rotational positions of the hollow sphere with a spectral hemispherical reflectance detector; and calculating a spectral hemispherical reflectance for the sample based on the plurality of reflectance data sets.

Clause 19: The non-transitory computer readable medium of clause 18, wherein the method includes rotating the sample about an axis of rotation perpendicular to an axis of rotation of the hollow sphere.

Clause 20: The non-transitory computer readable medium of clauses 18 or 19, wherein directing the beam of light with the series of reflective elements includes utilizing at least one galvanometer to direct the beam of light into a pair of opposing off-axis parabolic mirrors to create the plurality of predetermined angles of incidence striking the sample.

While various embodiments have been described, the description is intended to be exemplary rather than limiting. It will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

What is claimed is:

1. A system comprising:
    a laser configured to emit a beam of light;
    a series of reflective elements configured to direct the beam of light from the laser;
    a hollow sphere rotatable about a sphere axis with the sphere axis extending through a center of the hollow sphere, wherein the hollow sphere defines an elongated slot for accepting the beam of light when the hollow sphere is in one of a plurality of predetermined rotational positions about the sphere axis;
    a mounting arm extending into a central region of the hollow sphere, the mounting arm including a sample mount configured to receive a sample;
    a spectral hemispherical reflectance detector including a field of view extending into the hollow sphere; and
    a baffle horizontally interposed along a longitudinal axis perpendicular to the sphere axis between the spectral hemispherical reflectance detector and the elongated slot.

2. The system of claim 1, wherein the spectral hemispherical reflectance detector is horizontally aligned with the elongated slot along the longitudinal axis.

3. The system of claim 1, wherein the mounting arm is configured to rotate the sample about a mount axis that is perpendicular to the sphere axis.

4. The system of claim 1, wherein the longitudinal axis corresponds to a projected field of view of the spectral hemispherical reflectance detector.

5. The system of claim 1, wherein the series of reflective elements include a pair of opposing off-axis parabolic mirrors configured to direct the beam of light through the elongated slot in the hollow sphere.

6. The system of claim 5, wherein the series of reflective elements include a first galvanometer configured to direct the beam of light into one of the pair of opposing off-axis parabolic mirrors at a plurality of different angles.

7. The system of claim 6, wherein the series of reflective elements include at least one converging mirror configured to focus the beam of light from the laser into the first galvanometer.

8. The system of claim 7, wherein the series of reflective elements include a second galvanometer configured to direct the beam of light into the at least one converging mirror or into at least one fixed non-focusing mirror.

9. The system of claim 8, wherein the series of reflective elements include a third galvanometer configured to receive the beam of light from the laser and direct the beam of light into one of a first periscope having a first polarization or a second periscope having a second polarization prior to the beam of light reaching the second galvanometer.

10. The system of claim 1, wherein the baffle is attached to the mounting arm on an opposite side of the mounting arm from the sample mount and the sample mount is located adjacent a distal end of the mounting arm.

11. The system of claim 1, wherein a projected field of view of the spectral hemispherical reflectance detector onto the baffle is less than or equal to a detector surface area of the baffle.

12. The system of claim 1, wherein the spectral hemispherical reflectance detector is at least partially aligned with the elongated slot relative to the sphere axis.

13. A method of calculating a spectral hemispherical reflectance for a sample, the method comprising:
    emitting a beam of light from a laser;
    directing the beam of light with a series of reflective elements through an elongated slot defined by a hollow sphere between a plurality of predetermined angles of incidences striking a sample at each of a plurality of different predetermined rotational positions about a sphere axis extending through a center of the hollow sphere;
    collecting a plurality of reflectance data sets corresponding to each of the plurality of predetermined angles of incidence striking the sample at each of the plurality of different predetermined rotational positions of the hollow sphere with a spectral hemispherical reflectance detector; and
    calculating the spectral hemispherical reflectance for the sample based on the plurality of reflectance data sets.

14. The method of claim 13, further comprising directing the beam of light with the series of reflective elements through the elongated slot to strike an interior surface of the hollow sphere and directing the beam of light with the series of reflective elements to strike a light absorbing material.

15. The method of claim 13, wherein the series of reflective elements include at least one converging mirror for angles of incidence striking the sample at 75 degrees or more.

16. The method of claim 13, wherein directing the beam of light with the series of reflective elements includes utilizing at least one galvanometer to direct the beam of light into a pair of opposing off-axis parabolic mirrors to create the plurality of predetermined angles of incidence striking the sample.

17. The method of claim 13, including rotating the sample about an axis of rotation perpendicular to the sphere axis of rotation.

18. A non-transitory computer readable medium embodying programmed instructions which, when executed by a processor, are operable for performing a method comprising:
  emitting a beam of light from a laser;
  directing the beam of light with a series of reflective elements through an elongated slot in a hollow sphere between a plurality of predetermined angles of incidences striking a sample at each of a plurality of different rotational positions about a sphere axis extending through a center of the hollow sphere;
  collecting a plurality of reflectance data sets corresponding to each of the plurality of predetermined angles of incidence striking the sample at each of the plurality of different rotational positions of the hollow sphere with a spectral hemispherical reflectance detector; and
  calculating a spectral hemispherical reflectance for the sample based on the plurality of reflectance data sets.

19. The non-transitory computer readable medium of claim 18, wherein the method includes rotating the sample about an axis of rotation perpendicular to the sphere axis.

20. The non-transitory computer readable medium of claim 18, wherein directing the beam of light with the series of reflective elements includes utilizing at least one galvanometer to direct the beam of light into a pair of opposing off-axis parabolic mirrors to create the plurality of predetermined angles of incidence striking the sample.

* * * * *